United States Patent
Slaby et al.

(10) Patent No.: US 9,457,276 B2
(45) Date of Patent: Oct. 4, 2016

(54) COMPUTER GAME ELEMENTS, DEVICE AND METHODS THEREFOR

(71) Applicant: KING.COM LIMITED, St. Julians (MT)

(72) Inventors: Jakub Slaby, Greater London (GB); Mark Stephenson, Greater London (GB); Ben Hollis, Greater London (GB)

(73) Assignee: KING.COM LTD., St. Julians (MT)

( * ) Notice: Subject to any disclaimer, the term of this patent is extended or adjusted under 35 U.S.C. 154(b) by 249 days.

(21) Appl. No.: 14/224,380

(22) Filed: Mar. 25, 2014

(65) Prior Publication Data

US 2015/0273335 A1 Oct. 1, 2015

(51) Int. Cl.
| | |
|---|---|
| A63F 13/00 | (2014.01) |
| A63F 13/56 | (2014.01) |
| A63F 13/45 | (2014.01) |
| A63F 13/46 | (2014.01) |
| A63F 13/55 | (2014.01) |
| A63F 13/537 | (2014.01) |
| A63F 13/42 | (2014.01) |
| A63F 13/2145 | (2014.01) |
| A63F 13/57 | (2014.01) |

(52) U.S. Cl.
CPC ........... *A63F 13/56* (2014.09); *A63F 13/2145* (2014.09); *A63F 13/42* (2014.09); *A63F 13/45* (2014.09); *A63F 13/46* (2014.09); *A63F 13/537* (2014.09); *A63F 13/55* (2014.09); *A63F 13/57* (2014.09)

(58) Field of Classification Search
CPC ........ A63F 13/45; A63F 13/46; A63F 13/55; A63F 13/56; A63F 13/537; A63F 2011/0083
See application file for complete search history.

(56) References Cited

U.S. PATENT DOCUMENTS

| | | | | |
|---|---|---|---|---|
| 7,144,322 B2* | 12/2006 | Gomez | ................... | G07F 17/32 463/16 |
| 7,749,082 B2* | 7/2010 | Dunaevsky | ......... | G07F 17/3211 463/1 |
| 8,083,581 B2* | 12/2011 | Marks | ................. | G07F 17/3265 463/20 |

(Continued)

OTHER PUBLICATIONS

Candy Crush Cheats [online]. Nov. 12, 2013 [retrieved Jan. 21, 2016]. Retrieved from the Internet: < URL: http:candycrush-cheats.com>.*

*Primary Examiner* — Dmitry Suhol
*Assistant Examiner* — David Duffy
(74) *Attorney, Agent, or Firm* — Saul Ewing LLP

(57) ABSTRACT

In an embodiment there is provided a computer implemented method of controlling a user interface responsive to user engagement with a displayed game area on the interface, the method comprising the following implemented by at least one processor of a device, displaying a game area having a plurality of first game objects on said display, providing one or more characteristics of said first game objects and one or more action characteristics of at least one second game object, displaying said at least one second game object at a position on said game area, detecting user input re-arranging one or more of said first game objects, and activating said action characteristics of the at least one second game object in dependence on said detected input re-arranging said one or more first game objects to provide a sequence of two or more first game objects having one or more of the same characteristics adjacent the position of the second game object, and wherein at least one of the action characteristics of the second game object comprises revealing a further game object when said sequence is detected.

16 Claims, 7 Drawing Sheets

(56) References Cited

U.S. PATENT DOCUMENTS

| | | | |
|---|---|---|---|
| 8,460,092 B1* | 6/2013 | Slomiany | G07F 17/326 463/19 |
| 2007/0123339 A1* | 5/2007 | Sato | G07F 17/32 463/16 |
| 2009/0203415 A1* | 8/2009 | Falciglia, Sr. | A63F 1/00 463/11 |
| 2011/0111830 A1* | 5/2011 | Seelig | G07F 17/3265 463/20 |
| 2013/0090162 A1* | 4/2013 | Shellhamer | A63F 13/10 463/31 |
| 2013/0331162 A1* | 12/2013 | Krivicich | G06F 3/04812 463/10 |
| 2014/0080558 A1* | 3/2014 | Knutsson | A63F 13/12 463/10 |
| 2014/0080560 A1* | 3/2014 | Knutsson | A63F 13/12 463/10 |
| 2014/0080600 A1* | 3/2014 | Knutsson | A63F 13/12 463/31 |
| 2014/0128159 A1* | 5/2014 | Knutsson | A63F 13/12 463/31 |
| 2014/0171166 A1* | 6/2014 | Merari | A63F 13/80 463/9 |
| 2014/0235306 A1* | 8/2014 | Walls | A63F 13/10 463/9 |
| 2014/0243081 A1* | 8/2014 | Fliderman | A63F 13/65 463/31 |
| 2014/0274382 A1* | 9/2014 | Green | A63F 13/12 463/31 |
| 2014/0274418 A1* | 9/2014 | Knutsson | A63F 9/24 463/43 |
| 2014/0302935 A1* | 10/2014 | Royce | A63F 13/822 463/42 |
| 2014/0342791 A1* | 11/2014 | Hugh | A63F 13/80 463/9 |

* cited by examiner

COMPUTER GAME ELEMENTS, DEVICE AND METHODS THEREFOR

FIELD OF EMBODIMENTS

Some embodiments may relate to controlling a user interface responsive to user engagement with displayed game objects on the interface of a device.

Some embodiments may relate to devices having a user interface for engaging users or players in a computer game executable in an online or offline environment.

Some embodiments may relate to game objects in a computer game. Some embodiments may relate to game objects in a computer game in an online environment.

Some embodiments may relate to controlling a user interface responsive to user engagement with displayed objects on the interface of a computer device.

BACKGROUND

There are many technical challenges and technical considerations facing the designer of computer games executed on user or computer or other such devices having a user interface, such as designing a controllable user interface in the context of available computer devices and resources, which may be limited.

Another technical challenge can involve enabling a game to be engaging, or fun, accessible and compelling even when there is limited computing, display and/or technical input, or resource available, such as when a game is being played on a smartphone, tablet or other relatively small or portable user device.

Engagement involves designing gameplay to be compelling and rewarding to players. This typically requires games to be easily understood at their simplest or introductory levels, control inputs should provide rewarding gameplay across the spectrum of simple to complex game mechanics, which may become progressively more challenging so that players are not frustrated or bored, but remain engaged to develop rewarding skills.

Effective engagement may also require various forms of feedback to reinforce the user or player sense of success and accomplishment.

There are therefore many technical challenges when designing computer implemented games, particularly in providing a challenge to a user or player that is engaging and rewarding so as to provoke repeat play. This may, but not exclusively apply to "casual games" played on portable or mobile platforms with differing and in some cases limited computing, display, input and user time resources.

SUMMARY

According to an aspect, there is provided a computer implemented method of controlling a user interface responsive to user engagement with a displayed game area on the interface, the method comprising the following implemented by at least one processor of a device, displaying a game area having a plurality of first game objects on said display, providing one or more characteristics of said first game objects and one or more action characteristics of at least one second game object, displaying said at least one second game object at a position on said game area, detecting user input re-arranging one or more of said first game objects, and activating said action characteristics of the at least one second game object in dependence on said detected input re-arranging said one or more first game objects to provide a sequence of two or more first game objects having one or more of the same characteristics adjacent the position of the second game object, and wherein at least one of the action characteristics of the second game object comprises revealing a further game object when said sequence is detected.

The user input may comprise touch and move input, for example selection and subsequent movement of a selected first game object, so as to switch the position of the selected first game object with that of a neighbouring or adjacent first game object.

The characteristics of the first game objects may comprise the first game objects being coloured, and may further comprise that first game objects be distinguished or matched to other first game objects by being coloured differently or sharing the same colour.

The one or more first game object characteristics may comprise attributes defining a displayed colour.

The one or more first game object characteristics may comprise object type.

The action characteristics of the second game object may comprise the second game object adjacent said input sequence revealing a further game object when said sequence is detected.

The revealed further game object may be provided dependent on a rule.

In an embodiment, said rule providing said revealed further game object may comprise selecting from a store of first game objects, second game objects and further game objects in dependence on a weighting.

The weighting may be based on game state or progress.

In some embodiments the game state may comprise the frequency of the appearance of further game objects on the said game area prior to the selection.

In some embodiments the weighting may be based on a timer or target associated with the game or current game level.

In an embodiment, the weighting may be based on a move counter associated with the game or current game level. The weighting may be further based on a move counter passing a predefined threshold.

In some embodiments the weighting may be based on a random number function.

In some embodiments, the weighting may be dependent on the level of the game. For example, the weighting may depend on the overall ranking of the level (typically first encountered or lower levels are easier to complete and less challenging than later or higher levels).

In some embodiments, the weighting may alternatively or additionally depend on the number of levels completed.

In another embodiment, the weighting may depend on previously purchased boosters based on the user history stored in memory 220. Alternatively or additionally the weighting may depend on an overall history of user purchases stored in one or more of memory 220, server 320 or social network 330 of system environment 300.

At least one of the one or more second game object action characteristics may comprise said second game object, when displayed, obscuring the or a further game object.

In an embodiment, the at least one action characteristic may comprise the second game object revealing the further game object in dependence on a first detected input forming a sequence of first game objects having one or more of the same characteristics adjacent the second game object, and may further depend on subsequent input re-arranging displayed first game objects to provide a further sequence of two or more first game objects having one or more of the same characteristics adjacent the second game object.

At least one of the action characteristics of said second game object may comprise the second game object being graphically represented as a crate or box or safe.

In an embodiment, the crate, box or safe representing the second game object may graphically indicate to the user that it is locked further indicating to the user that it has multiple criteria to reveal the further object.

In some embodiments, the further game object comprises a game object in the form of a booster. A booster has characteristic that provide additional bonuses or moves, or line blasts or time resetting characteristics that for example may enable a user to clear a level faster for bonus rewards which may include boosters or further game objects themselves containing boosters, or may enable the user to complete a level that is difficult to clear or that the game state indicates they are struggling to clear.

Hence, the addition of the further object may educate the user to explore available additional objects such as boosters revealed by the further object, thereby providing a more engaging and compelling understanding of the game inciting repeat play and exploration of game mechanics.

The rule may provide a further game object selected from a store of game objects based on the frequency of the appearance of displayed first game objects on the said game area prior to the selection.

The algorithm may provide a further first game object selected from a store of first game objects based on a random number function to determine the provision.

According to another aspect, there is provided a device having a user interface responsive to user engagement and input with a displayed game area on the interface, and comprising a display to display said game area having a plurality of first game objects on said display, at least one memory storing one or more characteristics of said first game objects and one or more action characteristics of at least one second game object, and at least one processor configured to display said at least one second game object at a position on said game area on said display, detect user input re-arranging said first game objects, and process said action characteristics of the at least one second game object in dependence on said detected input re-arranging said first game objects to provide a sequence of two or more first game objects having one or more of the same characteristics adjacent the second game object, and wherein at least one of the stored action characteristics of the second game object comprises revealing a further game object when said sequence is detected.

In an embodiment, said memory may comprise at least one action characteristic associated with the second game object.

In an embodiment, said memory may store at least one rule providing said revealed further game object. The at least one rule may comprise selecting from a store of first game objects, second game objects and further game objects in dependence on a weighting.

The weighting may be based on game state or progress.

In some embodiments the game state may comprise the frequency of the appearance of further game objects on the said game area prior to the selection.

In some embodiments the weighting may be based on a timer or target associated with the game or current game level.

In an embodiment, the weighting may be based on a move counter associated with the game or current game level. The weighting may be further based on a move counter passing a predefined threshold.

In some embodiments the weighting may be based on a random number function.

At least one of the one or more second game object action characteristics may comprise said second game object, when displayed, obscuring the or a further game object.

In another embodiment, the at least one action characteristic of said second game object may comprise the revealing of a further game object in dependence on a first detected input forming a sequence of first game objects having one or more of the same characteristics adjacent the second game object, and subsequent input re-arranging other first game objects to provide a further sequence of two or more first game objects having one or more of the same characteristics adjacent the second game object.

Hence, a cascading effect is provided to encourage engagement and success at clearing the game area.

In an embodiment, said stored at least one action characteristic of said second game object may comprise that the displayed second game object is stationary with respect to said first game objects displayed on said game area.

In an embodiment, the further game object may comprise a booster.

According to yet another aspect there is provided a program comprising program code instructions that, when processed by a processor, causes said processor to perform the following steps, displaying a game area having a plurality of first game objects on said display, providing one or more characteristics of said first game objects and one or more action characteristics of at least one second game object, displaying said at least one second game object at a position on said game area, detecting user input re-arranging said first game objects, and activating said action characteristics of the at least one second game object in dependence on said detected input re-arranging said first game objects to provide a sequence of two or more first game objects having one or more of the same characteristics adjacent the second game object, and wherein at least one of the action characteristics of the second game object comprises revealing a further game object when said sequence is detected.

According to another aspect there is provided a computer readable storage device storing instructions that, when processed by a processor, causes said processor to perform the following steps, displaying a game area having a plurality of first game objects on said display, providing one or more characteristics of said first game objects and one or more action characteristics of at least one second game object, displaying said at least one second game object at a position on said game area, detecting user input re-arranging said first game objects, and activating said action characteristics of the at least one second game object in dependence on said detected input re-arranging said first game objects to provide a sequence of two or more first game objects having one or more of the same characteristics adjacent the second game object, and wherein at least one of the action characteristics of the second game object comprises revealing a further game object when said sequence is detected.

According to yet another aspect there is provided a device comprising means configured to display a game area having a plurality of first game objects, means for receiving user input, means for storing one or more characteristics of said first game objects and one or more action characteristics of at least one second game object, the means for storing being connected by communication means to processing means configured to display said at least one second game object at a position on said game area on said display, detect user input received from said user input means re-arranging said first game objects, and processing means configured to process said action characteristics of the at least one second game object in dependence on said detected input rearranging said first game objects to provide a sequence of two or more first game objects having one or more of the same characteristics adjacent the second game object, said storing means storing at least one action characteristic of the second game object comprising revealing a further game object when said sequence is detected.

The display means may comprise user interface means.

The user interface means may comprise the input means.

The input means may comprise touch control means.

The touch control means may comprise capacitive, resistive or gesture detecting means.

The means for storing said characteristics may further store a rule and/or an algorithm defining the creation and display of a further game object.

The processing means may control said display means to display said further game object on the displayed game area in dependence on said stored rule and/or algorithm.

BRIEF DESCRIPTION OF DRAWINGS

To understand some embodiments, reference will now be made by way of example only to the accompanying drawings, in which.

DETAILED DESCRIPTION OF SOME EMBODIMENTS

The techniques described herein can be implemented in for instance a computer game which involves the matching or switching of first game objects displayed on a game area or game board and the elimination of such to complete a level or aim or target of such a game. The game may be a so-called "casual" or "social" game, wherein short periods of play are undertaken by the user whenever appropriate according to the user's schedule.

Such games are increasingly offered and played by users on portable devices so as to fit in with the user's lifestyle and schedule. Such portable devices may have limited resources in terms of display screen size ("screen real-estate"), processing power and may be powered ostensibly by battery only thereby leading to a potentially short battery-life trade-off with use. Furthermore, the screen real-estate of such devices such as mobile phones may be limited. When such a screen is a so-called "touchscreen", then the limited dimensions and sensitivity of the touchscreen may lead to control and input issues due to the limited resources available. Such issues may all too often lead to user frustration when using the device, and especially when using the device in the context of playing a game with an objective and which may provide prizes or social data.

Given the user's lifestyle, and the potentially limited computing resources available, it can be a problem to motivate a user to complete a level of the game or fully explore the mechanics and rewards available without becoming frustrated. For example, in such games so called "boosters" are often introduced. Boosters typically provide a special effect that aids completion of the level. For example, a booster may have a "bomb" effect which explodes removing surrounding game objects in the vicinity of it. Other such boosters may provide line or row elimination effects, or object type effects. Other boosters may provide a score or bonus multiplier, or extra time in a time monitored or countdown level. Boosters may also provide extra moves in a game or level where moves are limited. Boosters may be offered for free, or appear during gameplay based on certain events, accomplishments or criteria, or be purchased from an online store for example.

The inventors have realised that even with the provision of boosters, it can be difficult to educate or motivate a user to explore the nature of such boosters. A proliferation of boosters may confuse a casual user, particularly considering the short periods of play undertaken by a user according to their busy schedule. This can lead to disengagement by the user, thereby preventing repeat play.

Figure 1:
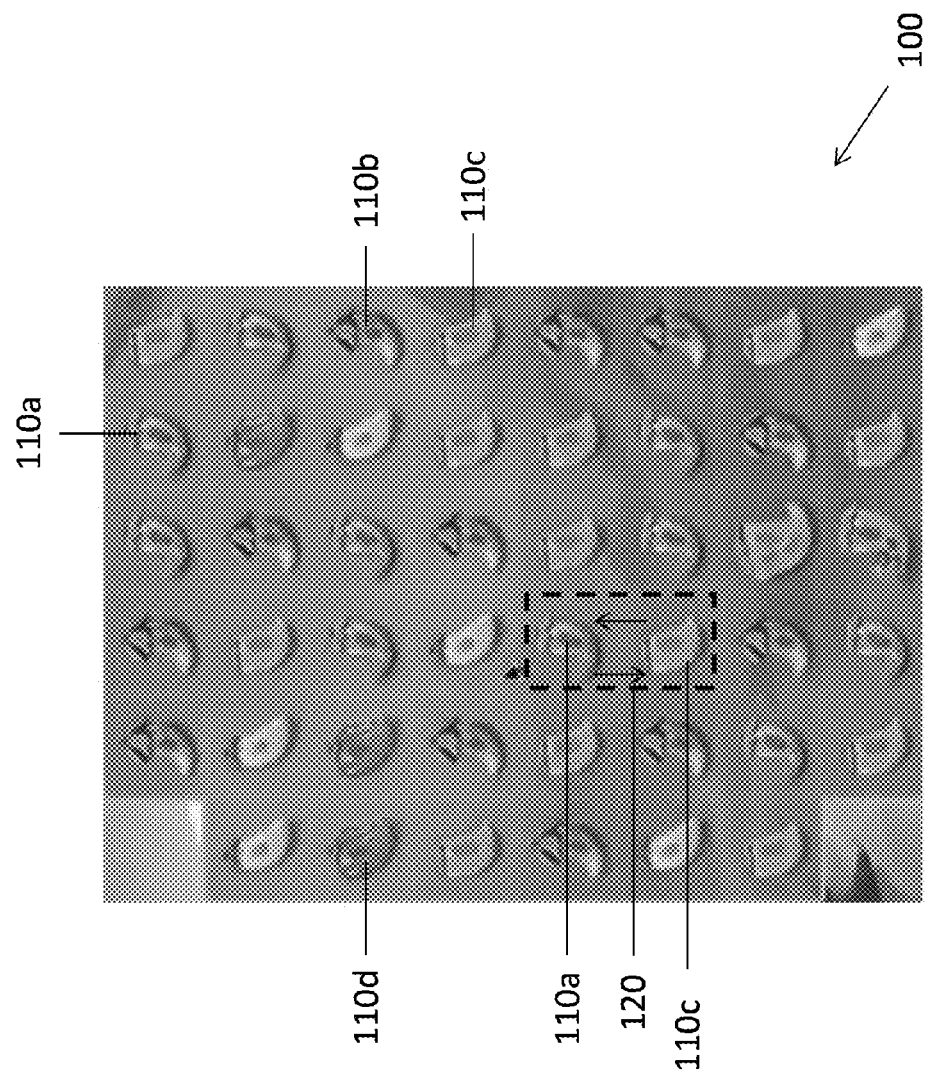
FIG. 1 shows an example embodiment of a game area or board.

FIG. 1 shows an example game board for display on a user device according to an embodiment. The game has a displayed game area 100 upon which are disposed first game objects 110a, 110b, 110c, 110d which may have varying characteristics. The characteristics may be one or more of colour, shape, and/or different types of objects. In this embodiment, the objects are differently coloured graphical representations of peppers or chilies.

The first game objects may have other characteristics defining graphical representations and shapes, and may represent different types of similar objects when displayed on the game area 100.

In some embodiments, the game may be implemented so that a level or a game session is completed when all or designated first game objects 110a, 110b, 110c, 110d on the game board 100 have been cleared or eliminated. The user may then progress to the next level.

First game objects 110a, 110b, 110c, 110d may be removed from the game board 100 by user input switching first game objects 120 to create a sequence. The sequence may require two or three or more first game objects 110a of the same type to be aligned in a row or column of said game area 100.

The user or player may in some embodiments be rewarded for good gameplay. For instance a series of consecutive targeting of neighbouring first game objects sharing at least one of the one or more data characteristics may increase a bonus multiplier, provide a booster or provide extra points, moves or time.

The game may, in one embodiment, end if the player or user runs out of time or moves or shots before managing to reach a designated target (not shown in FIG. 1).

The game board 100 may have a plurality of first game objects 110a, 110b, 110c, 110d having different characteristics aligned in rows and columns or forming patterns on the game board 100 as shown in FIG. 1. Other grid sizes or patterns may be suitable.

The first game objects 110a, 110b, 110c, 110d on the game board 100 may have four (or any other suitable number of) contact points with other neighbouring or adjacent first game objects.

Other game board layouts or configurations may be provided. For example, pyramidal, hexagonal, octagonal or other layouts comprising position spaces or tiles within the game board 100 may be provided for display.

In some embodiments the first game objects 110*a,* 110*b,* 110*c,* 110*d* may be depicted as peppers or chillies of differing colours. The number of differing colours may for example be three or more colours.

Figure 2:
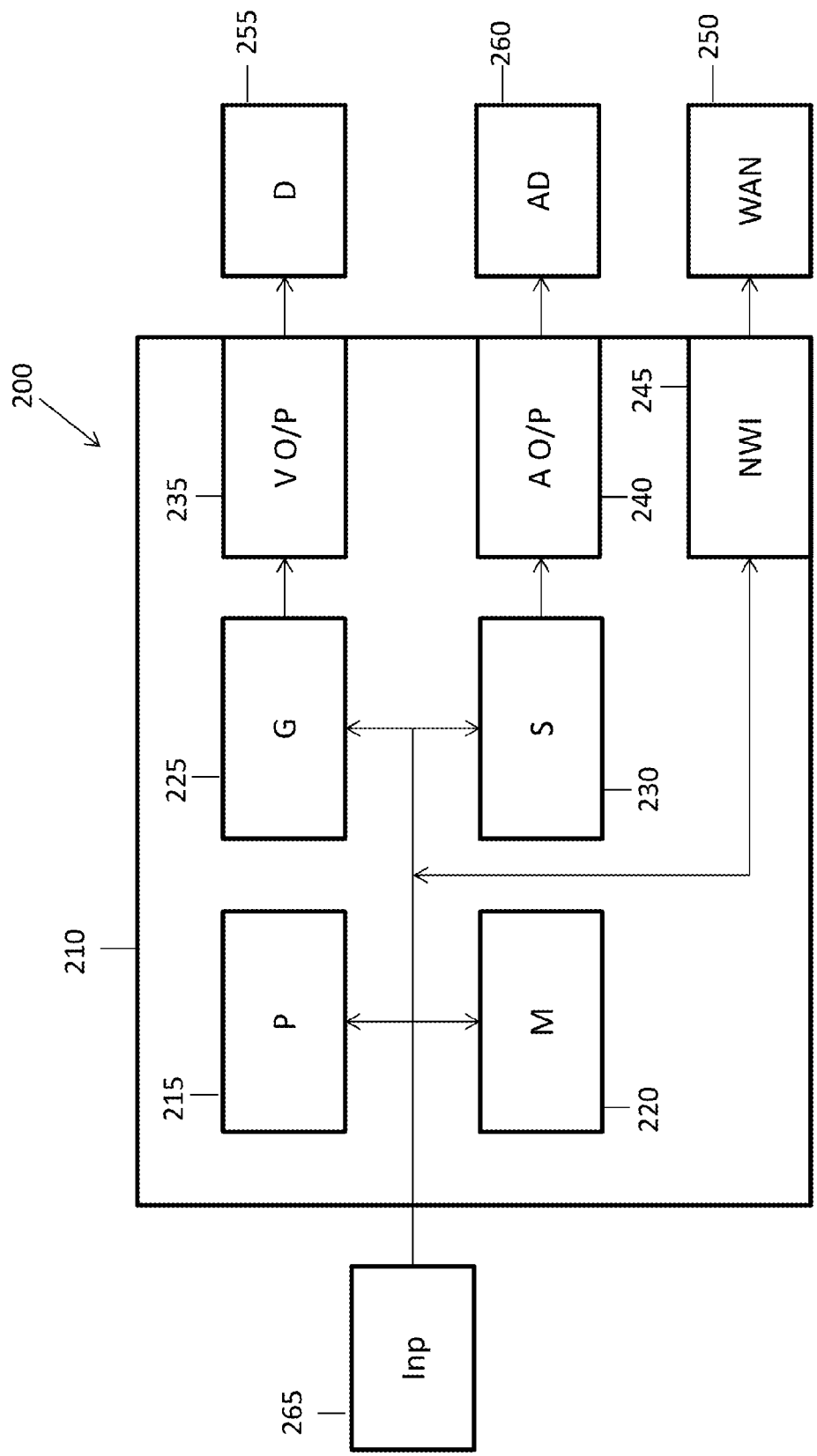
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other by an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
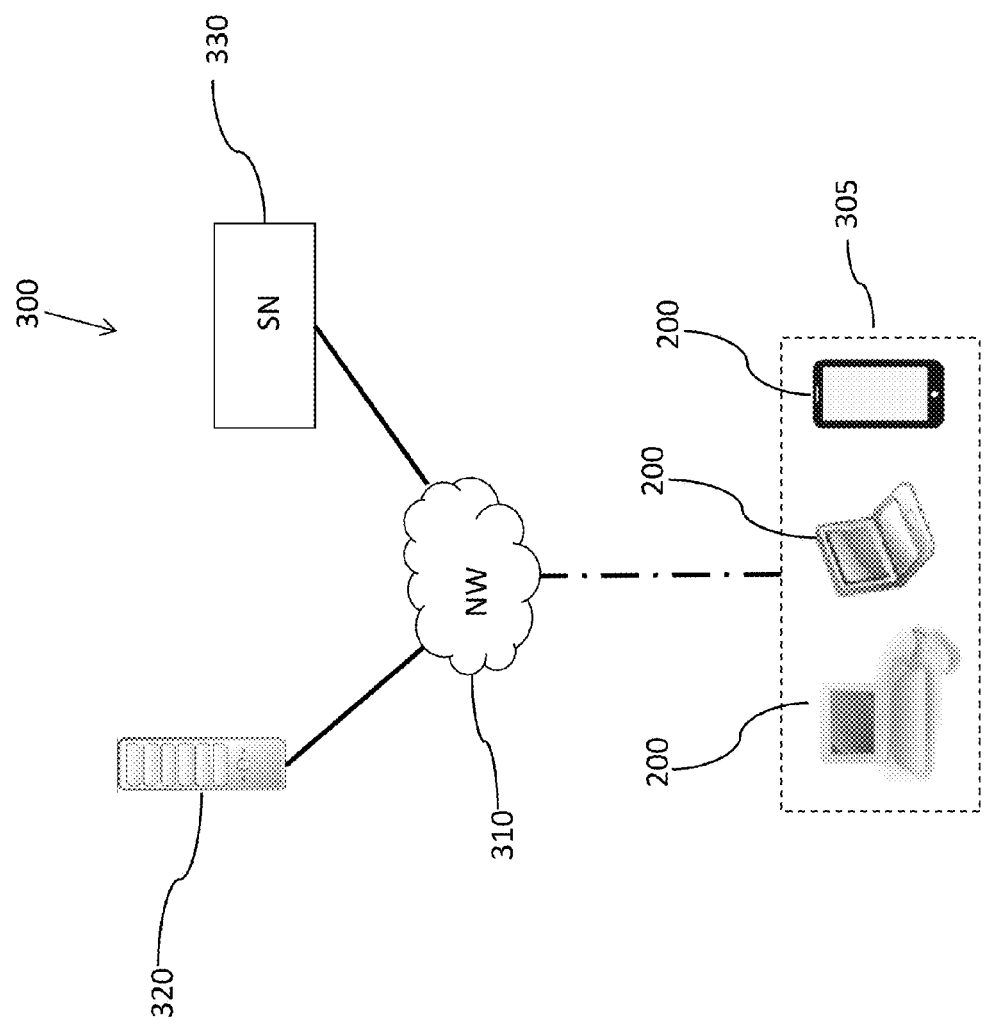
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other players 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Embodiments will now be described with reference to FIG. 4.

Figure 4:
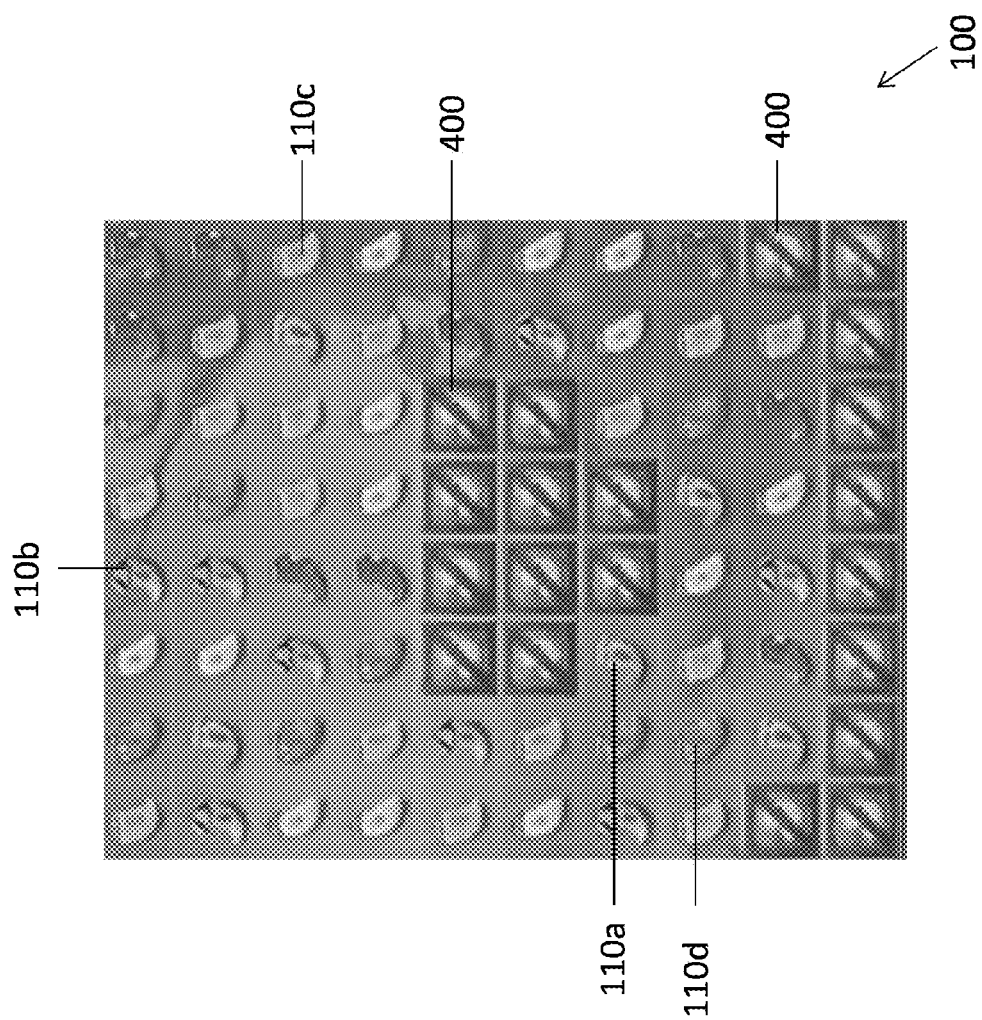
FIG. 4 illustrates an example game area or board displaying a second game object according to some embodiments.

FIG. 4 shows a game board 100 having first game objects 110*a,*110*b,*110*c,*110*d* disposed in cells or tiles thereon in a grid. Also shown are second game object(s) 400. In this embodiment second game object(s) 400 are depicted as crates. Other suitable graphical representations may be applied depending on the context of the game and the second game object' 400 actionable characteristics. The second game object may, in another embodiment be depicted as a safe, or a locked box. Such depictions are subject to the game designer and game context, and not limited to these examples alone.

An example actionable characteristic of the second game object will now be described with the aid FIG. 5 and FIG. 6.

Figure 5:
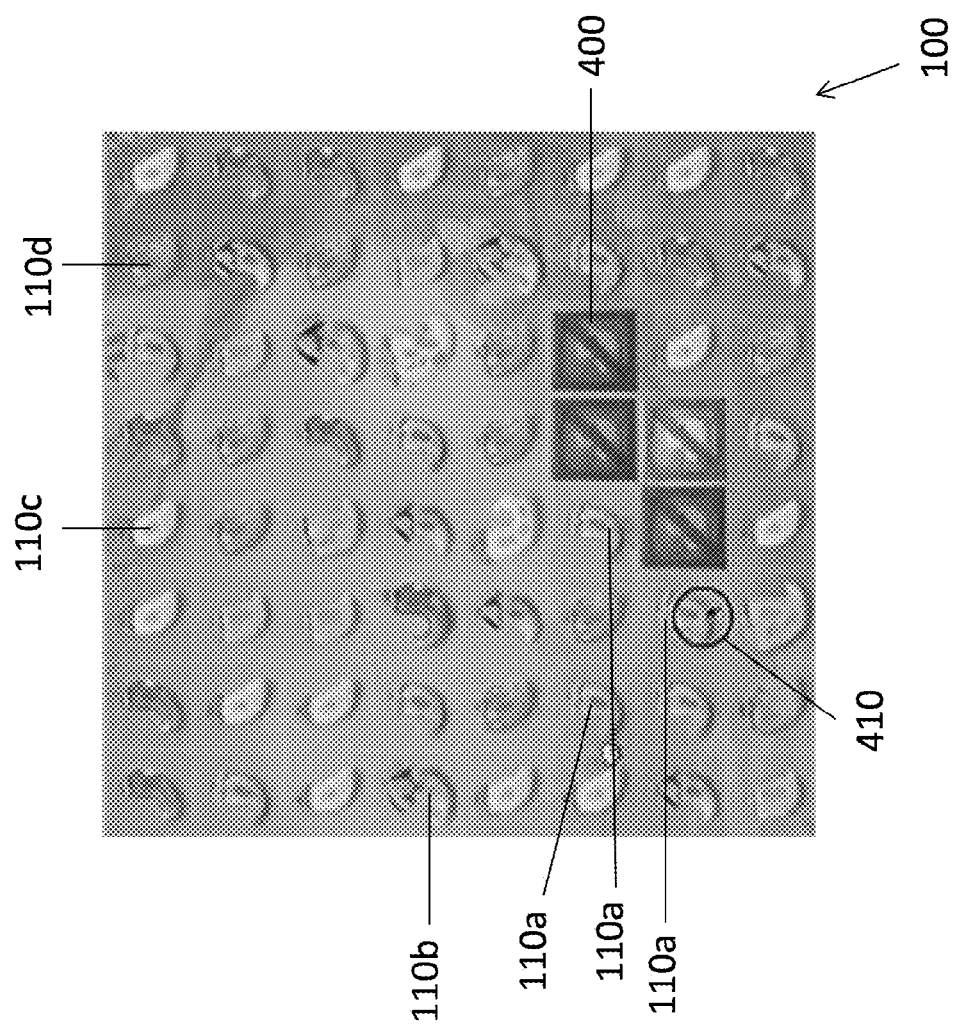
FIG. 5 illustrates an example game area or board displaying a second game object according to some embodiments.

FIG. 5 shows a game board 100 having first game objects 110*a,*110*b,*110*c,*110*d* disposed in cells or tiles thereon in a grid. Also shown are second game object(s) 400. In this embodiment second game object(s) 400 are depicted as crates. Other suitable graphical representations may be applied depending on the context of the game and the second game object' 400 actionable characteristics. FIG. 5 also depicts a selection switching indicator numeral 410, as a circle with a pointer within. This is shown in the Figure for clarity of explanation, and may for example be applied in an embodiment as referred to previously with reference to FIG. 3 comprising a web services or browser based personal computer or laptop 300 approach.

In other embodiments user devices 200 comprising touch or gesture or proximity enabled input means, such as a touchscreen, no selection indicator 410 may be visible or displayed to the user of that device 200.

Figure 6:
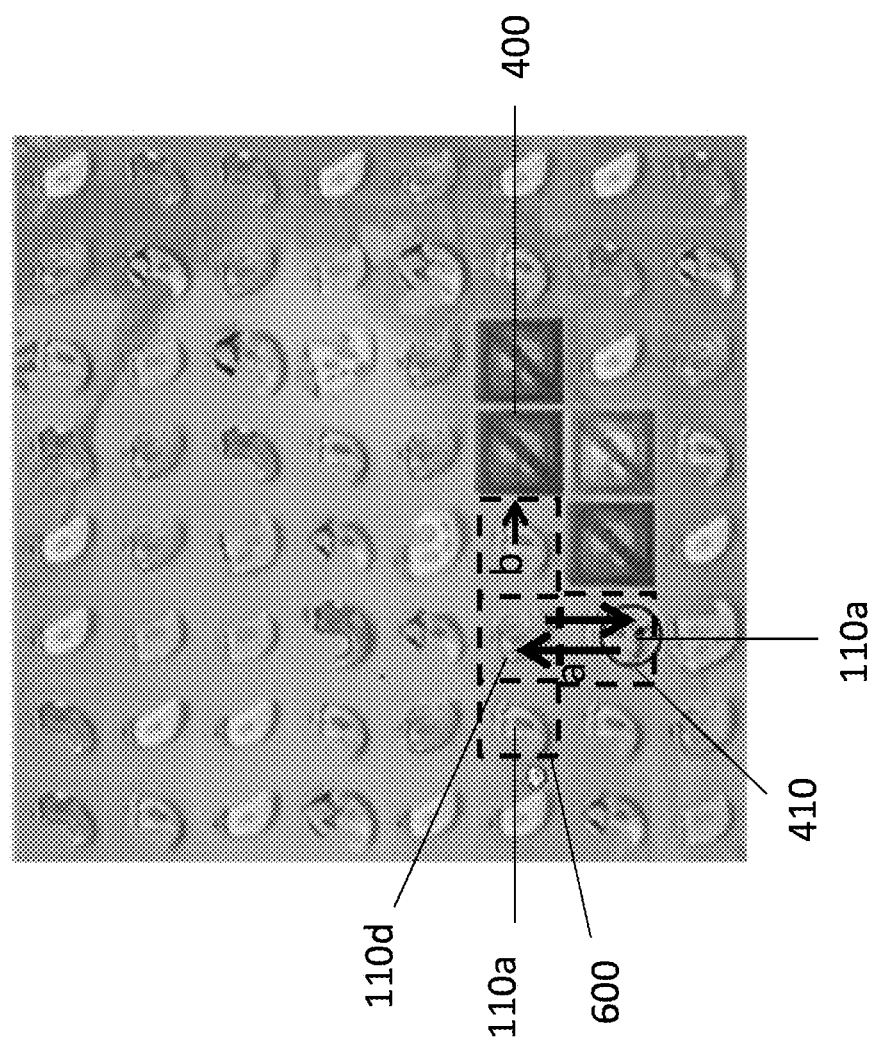
FIG. 6 depicts an example switch move according to an embodiment.

FIG. 6 illustrates an actionable characteristic of a second game object 400 which depends on a switching or selecting rule. As can be seen in the Figure, a user selects 410 game object 110*a* and subsequent input detected by the input 265 indicates a move or switch of the first game object 110*a* to the position adjacent occupied by object 110*d*. This is indicated in the Figure by arrow "a".

Hence, the user performs a switch which places two or three or more matching first game objects 110*a* together in a sequence 600. In this embodiment this matching sequence eliminates the three matching first game objects 110*a* and provides a score to the user. Furthermore, in this embodiment the matching 600 adjacent second game object 400 has a further effect in causing the actionable characteristic (indicated by the arrow "b" in the Figure) of second game object 400 adjacent the matching three first game objects to be activated.

In one embodiment the actionable characteristic eliminates the second game object to reveal a further game object on the display 255.

In one embodiment, this is to reveal a first game object 110a, 110b, 110c, 110d.

In another embodiment the revealed further game object 400 is provided dependent on a rule. The rule providing said revealed further game object for example comprises selecting from a store of one or more first game objects 110a, 110b, 110c, 110d, second game objects 400 and further game objects. There may be a weighting associated with each possible further game object. Alternatively or additionally the weighting may be based on game state or progress.

In some embodiments the game state comprises the frequency of the appearance of further game objects on the said game area prior to the selection.

In some embodiments the weighting may be based on a timer or target or move counter (or a combination of one or more of these) associated with the game or current game level. For example, if the time remaining to complete the level is diminishing, the generation of a second game object may be modified to aid the revealing of a further object. If the further object when activated reveals a booster, the booster may aid completion of the level by for example increasing the time remaining In this way, the user may be engaged to discover the effects of boosters, and hence encouraged to explore or play the game further.

In another embodiment, the weighting may be based on a move counter associated with the game or current game level. The weighting may be further based on a move counter passing a predefined threshold.

In some embodiments the weighting may be based on a random number function.

In some embodiments, the weighting may be dependent on the level of the game. For example, the weighting may depend on the overall ranking of the level (typically first encountered or lower levels are easier to complete and less challenging than later or higher levels). The weighting may alternatively or additionally depend on the number of levels completed in some embodiments.

In another embodiment, the weighting may depend on previously purchased boosters based on the user history stored in memory 220. Alternatively or additionally the weighting may depend on an overall history of user purchases stored in server 320 and social network 330 of system environment 300.

At least one of the one or more second game object 400 action characteristics may comprise said second game object 400, when displayed, obscuring the or a further game object. Hence the second game object 400 "hides" the further game object and provides an incentive to the user to activate the second game object 400 to reveal the further object inside. An engaging mechanic may therefore be provided.

In an embodiment, the at least one action characteristic may comprise the second game object 400 revealing the further game object in dependence on a first detected input 265 forming a sequence of first game objects 110a, 110b, 110c, 110d having one or more of the same characteristics adjacent the second game object 400, and may further depend on subsequent input re-arranging displayed first game objects 110a, 110b, 110c, 110d to provide a further sequence of two or more first game objects 110a, 110b, 110c, 110d having one or more of the same characteristics adjacent the second game object 400. This provides a cascading effect which may further provide second game objects on the game area 100.

The rule may, in some embodiments comprise providing the further game object in dependence on an algorithm. For example, the further game object may be selected from in dependence on the number of first game objects 110a,110b, 110c,110d currently displayed 255.

In another embodiment, the algorithm may comprise providing the further game object in dependence on the frequency of previously generated and displayed first game objects 110a,110b,110c,110d sharing the characteristics of the generated game object and/or second game object.

The algorithm providing a further game object may further comprise selecting from a store of first game objects 110a,110b,110c,110d and/or second game objects based on a random number function to determine the provision.

In another embodiment, the rule or algorithm may determine that no further game object is revealed.

In the above an action characteristic of the second game object 400 may be triggered or activated by matching 600 a sequence of first game objects 110a adjacent the second game object.

Other variations of action characteristics may be implemented in some embodiments.

For example, in an embodiment the action characteristic of the second game object 400 revealing the further game object may depend on a cascading sequence of matches caused by a first or successive matching sequence. For example, a first detected input forming a sequence of first game objects 110a,110b,110c,110d having one or more of the same characteristics adjacent the second game object may be detected, and subsequent input re-arranging other first game objects to provide a further sequence of two or three or more first game objects 110a,110b,110c,110d having one or more of the same characteristics adjacent the second game object 400 is required to cause the action characteristic to activate.

Thus, more than one sequence or event may be required to activate the second game object 400. For example, the second game object may be graphically represented as a box or container with a lock, or a safe for instance, implying to the user that several events may be required to "unlock" the second game object. Hence a multi-step action characteristic for second game objects 400 is provided.

Second game objects 400 having differing action characteristics, as described above, may be provided in the same game and displayed on the same game board 100 to effect improved user engagement with the game.

The revealed further game object may comprise a second game object 400, with the same or differing action characteristics therefore providing further challenge and engagement.

Figure 7:
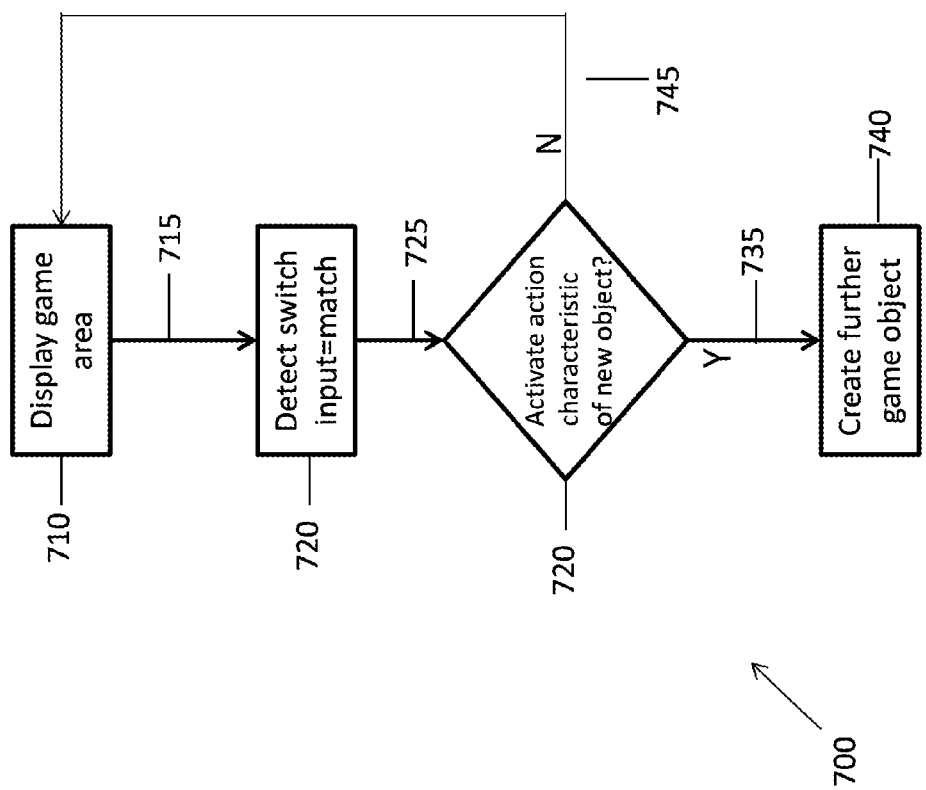
FIG. 7 is a flowchart depicting steps of a method according to an embodiment.

FIG. 7 illustrates a flow chart 700 showing steps according to an embodiment. At step 710 a game area or game board 100 is displayed 255 on the user device 200, 305. At least one processor 215, 320 subsequently monitors 715 user input and detects whether a user input provides a match at step 720. On detection of a match or switch input the processor 215, 320 analyses for a second game object 400 adjacent to, or in the vicinity (for example two cells or tiles of the game board 100) of the matching first game objects 110a,110b,110c,110d. If no such second game object 400 is adjacent to, or in the vicinity, process flow returns from step 730 to the start 710 via path 745.

If there is such a second game object 400 adjacent to, or in the vicinity (for example two cells or tiles of the game board 100) then the action characteristic of the second game object 400 is activated 735 in dependence on the user input satisfying the criteria of the action characteristic, and flow continues under control of the at least one processor 215, 320 to step 740 where a further game object is created and revealed to the user.

The creation of the further game object may (not shown in the Figure) further depend on a rule. The rule may, in some embodiments comprise providing the further game object in dependence on an algorithm. For example, the further game object may be selected in dependence on the number of first game objects 110a,110b,110c,110d currently displayed 255.

In another embodiment, the algorithm may comprise providing the further game object in dependence on the frequency of previously generated and displayed first game objects 110a,110b,110c,110d sharing the characteristics of the generated first game object and/or second game object.

The algorithm providing a further game object may further comprise selecting from a store of first game objects 110a,110b,110c,110d and/or second game objects based on a random number function to determine the provision.

In some embodiments, the rule or algorithm may determine that no further game object is revealed or created as described hereinbefore.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes embodiments of the invention, there are several variations and modifications which may be made to the disclosed solution without departing from the scope of the present invention.

The invention claimed is:

1. A computer implemented method of controlling a user interface responsive to user engagement with a displayed game area on the interface, the method comprising the following implemented by at least one processor of a device:
   displaying a game area having a plurality of first game objects on said display,
   providing one or more characteristics of said first game objects and one or more action characteristics of at least one second game object,
   displaying said at least one second game object at a position on said game area,
   detecting user input re-arranging one or more of said first game objects, and
   activating said action characteristics of the at least one second game object in dependence on said detected input re-arranging said one or more first game objects to provide a sequence of two or more first game objects having one or more of the same characteristics adjacent the position of the second game object, and wherein at least one of the action characteristics of the second game object comprises revealing a further game object when said sequence is detected, wherein the revealed further game object is provided in dependence on on a rule, said rule providing said revealed further game object comprises selecting from a store of first game objects, second game objects and further game objects in dependence on a weighting, said weighting being based on one of:
      frequency of the appearance of further game objects on the said game area prior to the selection;
      a timer associated with the game; and
      a move counter associated with the game.

2. A method according to claim 1 wherein the revealed further game object is a first game object.

3. A method according to claim 1, wherein said weighting is based on the frequency of the appearance of further game objects on the said game area prior to the selection.

4. A method according to claim 1, wherein said weighting is based on a timer associated with the game.

5. A method according to claim 1, wherein said weighting is based on a move counter associated with the game.

6. A method according to claim 5, wherein said weighting is based on a move counter passing a predefined threshold.

7. A method according to claim 1, wherein at least one of the one or more second game object action characteristics comprise said second game object, when displayed, obscuring a further game object.

8. A method according to claim 1, wherein the action characteristic comprises the second game object revealing the further game object in dependence on:
   a first detected input forming a sequence of first game objects having one or more of the same characteristics adjacent the second game object,
   and subsequent input re-arranging other first game objects to provide a further sequence of two or more first game objects having one or more of the same characteristics adjacent the second game object.

9. A method according to claim 1, wherein the action characteristics of said second game object comprise the second game object being graphically represented as a crate or box.

10. A method according to claim 1, wherein said further game object comprises a booster object providing an additional game function.

11. A device having a user interface responsive to user engagement and input with a displayed game area on the interface, and comprising:
   a display to display said game area having a plurality of first game objects on said display,
   at least one memory storing said first game objects and one or more characteristics of said first game objects, second game objects, and one or more action characteristics of at least one second game object and further game objects,
   and at least one processor configured to:
   display said at least one second game object at a position on said game area on said display,
   detect user input re-arranging said first game objects, and process said action characteristics of the at least one second game object in dependence on said detected input re-arranging said first game objects to provide a sequence of two or more first game objects having one or more of the same characteristics adjacent the second game object, and wherein at least one of the stored action characteristics of the second game object comprises revealing a further game object when said sequence is detected, wherein said at least one processor is configured such that the revealed further game object is provided in dependence on a rule, said rule providing said revealed further game object comprises selecting from said memory of first game objects, second game objects and further game objects in dependence on a weighting, said weighting being based on one of:

frequency of the appearance of further game objects on the said game area prior to the selection;

a timer associated with the game; and a move counter associated with the game.

12. A device according to claim 11, wherein said processor is further configured to receive an algorithm stored in the at least one memory to control second and further game object generation.

13. A device according to claim 11, wherein said action characteristics of said second game object comprise that the displayed second game object is stationary with respect to said first game objects displayed on said game area.

14. A device according to claim 11 wherein said further game object comprises a booster object providing an additional game function.

15. A device according to claim 11, wherein the action characteristic comprises the second game object revealing a further game object in dependence on:

a first detected input forming a sequence of first game objects having one or more of the same characteristics adjacent the second game object, and subsequent input re-arranging other game objects to provide a further sequence of two or more first game objects having one or more of the same characteristics adjacent the second game object.

16. A computer readable non-transitory storage medium carrying one or more sequences of instructions which, when processed by a processor, causes said processor to perform the following steps:

displaying a game area having a plurality of first game objects on said display, providing one or more characteristics of said first game objects and one or more action characteristics of at least one second game object, displaying said at least one second game object at a position on said game area, detecting user input re-arranging said first game objects, and activating said action characteristics of the at least one second game object in dependence on said detected input re-arranging said first game objects to provide a sequence of two or more first game objects having one or more of the same characteristics adjacent the second game object, and wherein at least one of the action characteristics of the second game object comprises revealing a further game object when said sequence is detected, wherein the revealed further game object is provided in dependence on a rule, said rule providing said revealed further game object comprises selecting from a store of first game objects, second game objects, and further game objects in dependence on a weighting, said weighting being based on one of:

frequency of the appearance of further game objects on the said game area prior to the selection;

a timer associated with the game; and a move counter associated with the game.

\* \* \* \* \*